(12) United States Patent
Marum Campos et al.

(10) Patent No.: US 7,319,998 B2
(45) Date of Patent: Jan. 15, 2008

(54) METHOD AND SYSTEM FOR SUPPORTING SYMBOLIC SERENDIPITY

(75) Inventors: José Manuel Marum Campos, Viseu (PT); António Costa Dias De Figueiredo, Coimbra (PT)

(73) Assignee: Universidade de Coimbra, Coimbra (PT)

( * ) Notice: Subject to any disclaimer, the term of this patent is extended or adjusted under 35 U.S.C. 154(b) by 449 days.

(21) Appl. No.: 10/987,455

(22) Filed: Nov. 12, 2004

(65) Prior Publication Data
US 2005/0120015 A1 Jun. 2, 2005

Related U.S. Application Data

(60) Provisional application No. 60/520,447, filed on Nov. 14, 2003.

(51) Int. Cl.
*G06F 17/30* (2006.01)
(52) U.S. Cl. .................... 707/4; 707/6; 707/104.1; 706/45
(58) Field of Classification Search .......... 707/4, 707/5, 6, 104.1; 706/45, 46, 50
See application file for complete search history.

(56) References Cited

U.S. PATENT DOCUMENTS

| | | | |
|---|---|---|---|
| 5,724,567 A | 3/1998 | Rose et al. | |
| 5,867,799 A | 2/1999 | Lang et al. | |
| 6,006,218 A | 12/1999 | Breese et al. | |
| 6,016,475 A | 1/2000 | Miller et al. | |
| 6,018,738 A | 1/2000 | Breese et al. | |
| 6,041,311 A | 3/2000 | Chislenko et al. | |
| 6,049,777 A | 4/2000 | Sheena et al. | |
| 6,064,980 A | 5/2000 | Jacobi et al. | |
| 6,092,049 A | 7/2000 | Chislenko et al. | |
| 6,108,493 A | 8/2000 | Miller et al. | |
| 6,112,186 A | 8/2000 | Bergh et al. | |
| 6,233,575 B1 * | 5/2001 | Agrawal et al. | 707/6 |
| 6,236,990 B1 | 5/2001 | Geller et al. | |
| 6,321,221 B1 | 11/2001 | Bieganski | |
| 6,330,592 B1 | 12/2001 | Makuch et al. | |
| 6,334,127 B1 * | 12/2001 | Bieganski et al. | 707/5 |
| 6,412,012 B1 | 6/2002 | Bieganski et al. | |
| 6,438,579 B1 | 8/2002 | Hosken | |
| 6,463,433 B1 | 10/2002 | Baclawski | |
| 6,487,539 B1 | 11/2002 | Aggarwal et al. | |
| 6,618,714 B1 | 9/2003 | Abrahams | |
| 6,728,706 B2 | 4/2004 | Aggarwal et al. | |
| 7,117,207 B1 * | 10/2006 | Kerschberg et al. | 707/5 |
| 2002/0091736 A1 * | 7/2002 | Wall | 707/513 |
| 2003/0093421 A1 * | 5/2003 | Kimbrough et al. | 707/3 |

(Continued)

*Primary Examiner*—Christian Chace
*Assistant Examiner*—Dung K Chau
(74) *Attorney, Agent, or Firm*—Brinks Hofer Gilson & Lione

(57) ABSTRACT

The present invention provides a method and system for supporting serendipity and pseudo-serendipity. A collection of profiles are generated to model the user's worldview. A collection of shadow profiles are generated to model divergent knowledge based on the user's profiles and external information or knowledge sources. A collection of items are retrieved from the profiles and used to perform a deliberate search for laterality. The initial and lateral items are merged into a search string. The search string is used to perform a search or wandering process that is aware of potential serendipitous stimuli in an information space. The discovered, unexpected, unsought, unforeseen stimuli are intended to be subsequently presented to the user.

3 Claims, 2 Drawing Sheets

U.S. PATENT DOCUMENTS

2003/0135445 A1* 7/2003 Herz et al. .................... 705/37
2004/0039814 A1* 2/2004 Crabtree et al. ............ 709/224
2004/0044658 A1* 3/2004 Crabtree et al. ............... 707/3

* cited by examiner

METHOD AND SYSTEM FOR SUPPORTING SYMBOLIC SERENDIPITY

CROSS-REFERENCE TO RELATED APPLICATIONS

This application claims benefit to U.S. Provisional application Ser. No. 60/520,447 filed Nov. 14, 2003.

BACKGROUND

The present invention relates to both information retrieval and cognitive science. It aims at presenting the users with pseudo-serendipitous and serendipitous information that prompts them for discovery in a wide number of fields, which include, but are not limited to, cross-selling in traditional business and e-business systems, cross-reference in Internet search engines, generation of creative insights, scientific discovery, marketing, e-learning systems, career counseling, etc.

Serendipity, defined as the ability to find interesting or valuable things just by chance, is acknowledged as one of the most effective catalysts in scientific, technological and artistic development, and is repeatedly associated with major turning points in science, technology and art, apart from its very impact in daily life. The phenomenon is typically described and easily recognized when someone is concerned with some problematic situation(s) and unexpectedly stumbles on a typically unrelated finding.

This unexpected, unsought finding is often important to solve the current problematic situation or for the resolution of a distinct and known problematic situation that is totally or partially unrelated to the one that was at hand when the serendipitous event occurred. These two phenomena are commonly defined as pseudo-serendipity, for the unexpected finding—the resolution of a known problematic situation—was already sought for.

Frequently, the serendipitous event presents the person with a new, unrelated, unexpected, unsought problematic situation, instead of the solution to a currently known problematic situation. Other times, the serendipitous event presents the person with an unknown, unexpected, unsought relationship between two or more seemingly unrelated pieces of information. These two phenomena define true serendipity: the chance discovery of an unsought finding.

Computer systems have always been concerned with processing information to support the tasks and information needs of the users. The value and usefulness of such systems is determined by the value and usefulness of the information they provide. This agrees with our second nature of valuing only what seems relevant for the situation at hand, and of discarding what is supposedly irrelevant. Avoiding cognitive overload has also been pointed out as an important reason for concentrating just on what is supposedly relevant. Yet, serendipity seems to express the opposite: most frequently, what is serendipitously found is totally or partially irrelevant for the current concerns, but offers an important contribution to another, unrelated situation.

One particular field of computer science, information retrieval, is specifically related to the essence of this invention. The main goal of current Information Retrieval Systems is to find what the user wants. This is what is usually needed. However, there is an alternative way of finding and using information that has been widely recognized by those skilled in the art. The alternative way concerns finding and acquiring unsought information in an accidental, incidental, or serendipitous manner.

Up to now, Information Retrieval Systems (hereafter "IRS") have been unable to support serendipity, mostly due to their inner rationale and purpose. The main reason why serendipity has not been put at the service of serious scientific research and technological application is its apparent unmanageability: how (and why) could one provide someone with conspicuous, interesting, but unexpected and unsought information if the only ingredient of the process is chance? While information retrieval is about convergence toward the user's interests, through procedures that rely on accuracy and precision, serendipity is about divergence toward unknown, unexpected, unsought findings and stands at the limit of happenstance. IRS only move when they have a direction in which to move, whereas serendipity moves in order to generate direction.

Some attempts have been made to explore the concept of serendipity, namely in the field of information retrieval. One particular proposal is described in U.S. Published Application No. 20030093421, published May 15, 2003, entitled "Process and System for Matching Products and Markets", which claims to provide a search method and system for matching a commodity to one or more applications for using the commodity. The process consists in expanding the user's search spectrum to regions of the information space beyond his or her obvious choices and mastered areas of knowledge, using pattern matching procedures over the properties of commodities and markets, and classification schemes. Although some unobvious findings may come out from this method and system, there is an undeniable deliberate intention to find something using the method or system (namely, a matching between some commodity and market(s)), which inexorably transforms the whole process, at most, into a pseudo-serendipitous process, even when the resulting matches could not be anticipated by the user. Additionally, the search method and system are fairly deterministic: given a specific commodity and its properties, a specific information space in which to search, a specific classification scheme to classify the retrieved data, it is quite possible to predict the potential outcomes of the system. Therefore, though uncovering unsought findings occasionally, the method and system reveal this rather dissimulated deterministic behavior, which neglects serendipity by discarding one of its most important ingredients: chance.

Another proposal is described in U.S. Pat. No. 6,334,127, entitled "System, Method and Article of Manufacture for Making Serendipity-Weighted Recommendations to a User", which claims to provide the user with serendipitous recommendations. The real benefits of such invention is the ability to remove the trivial and obvious recommendations (which are provided by typical recommender systems) from the user's sight by setting down the accuracy criteria to such a level that some unobvious items are suddenly pulled up in the prediction ranking. This invention misunderstands serendipity, confusing the concepts of serendipity and novelty. Even though finding new, interesting items, the user still finds what he or she was searching for, that is, something within the scope of his or her current concerns. This underlying characteristic is, in fact, revealed by the spirit and scope of the invention, which intends to provide items based on the user's preferences or interests, new items still liked by the user [sic]. This way, again, we have a system for providing pseudo-serendipitous recommendations, since its results cannot be considered as completely unsought.

As no existing technology is able to deliberately provide information in a serendipitous manner, the need exists for methods and systems capable of processing information for the purpose of fostering serendipity and pseudo-serendipity.

SUMMARY OF THE INVENTION

The primary object of the present invention is to provide a method and system for supporting serendipity and pseudo-serendipity. A collection of profiles is generated and maintained which is intended to represent the user's worldview—anything that might compose the person's cognitive individuality. Each profile is intended to model one specific aspect of the user's worldview. The profiles may either be explicitly updated by the user or implicitly derived from the user's behavior while interacting with information spaces, like the online system. A collection of shadow profiles is created and maintained to represent divergent knowledge derived from the user's profiles. Each user profile may have one or more corresponding shadow profiles. The knowledge encoded in the shadow profiles need not to be strictly related to the knowledge in the corresponding profile, nor be considered relevant to describe accurately the real user's worldview: unrelated, unexpected, and even wrong knowledge is considered important and welcome for the generation of the shadow profiles. The generation and management of the profiles is performed by a Profiles Management Module. The divergence process is performed by a Divergence Module. Two or more profiles are chosen, either randomly or manually. From those profiles, a set of items are selected through a controlled random process, forming a collection of entry points. A random number of items are selected from the entry points and used to perform a deliberate search for laterality, which is intended to discover lateral items outside the very content of the user's profiles. The deliberate search for laterality is performed by the Divergence Module. The resulting lateral items are merged in a variety of means with the entry points, and the resulting collection of items is used to create a search string, which is used to perform a search/wandering in an information space, which is aimed at discovering potentially interesting nodes of information—unexpected pieces of information outside the interests of the user but conforming the user's sagacity. A heuristic function is used to determine if a node of information is suitable as a serendipitous stimulus. The discovered nodes of information which are considered potential serendipitous stimuli are intended to be subsequently presented to the user in a variety of manners, depending on the specificities of particular embodiment of the invention.

Additional object and novel features of the invention will be set forth in part in the descriptions and drawings which follow, all of which are intended to be for illustrative purposes only, and not intended in any way to limit the invention, and in part will become apparent to those skilled in the art on examination of the following, or may be learned by practice of the invention.

The drawings constitute a part of this specification and include exemplary embodiments to the invention, which may be embodied in various forms.

BRIEF DESCRIPTION OF THE DRAWINGS

The invention may be understood by reference to the following detailed description and the exemplary embodiments of the invention taken in conjunction with the accompanying drawings.

DESCRIPTION OF THE PREFERRED EMBODIMENT(S)

Figure 1:
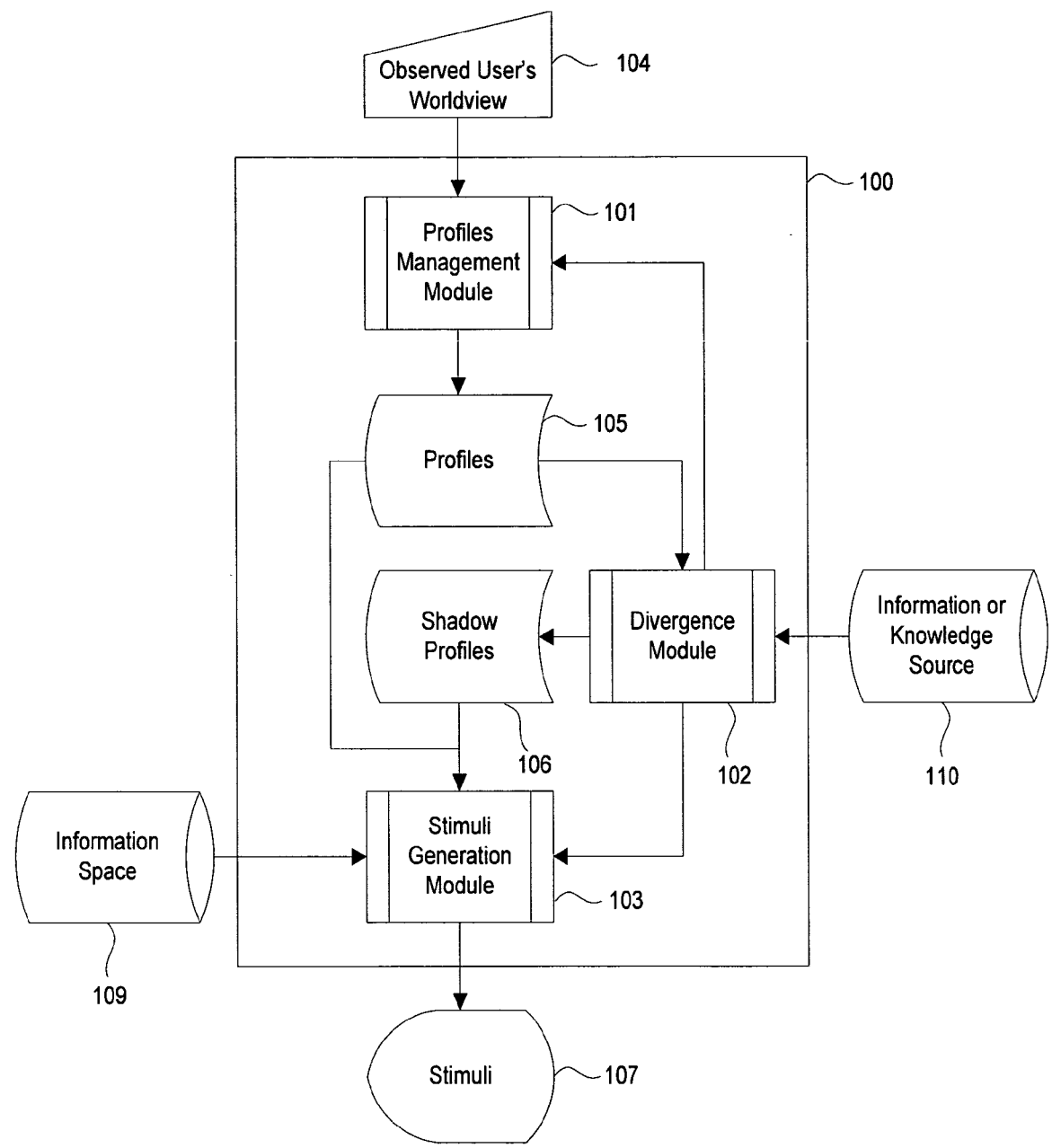
FIG. 1 illustrates a system for generating serendipitous stimuli according to one embodiment of the invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As those skilled in the art would know, serendipity occurs as a consequence of, at least in part, two elements: chance and the person's sagacity. Therefore, a method and system for supporting serendipity ought to be based on chance and the person's sagacity. The present invention provides a method and system for supporting serendipity and pseudo-serendipity. This invention discloses a novel method of providing information to the user, information that, apart from being unsought, unexpected and unforeseen, is aimed at stimulating the user's sagacity and at providing the user with cognitive material for the formation of creative and/or insightful ideas. We assert that such a method and system built to induce serendipitous insights is relevant to the user, since unsought, unexpected, unforeseen information might bring out ideas far beyond the user's imagination and known paradigms, provided that the stimuli are conspicuous to the user's sagacity.

In a preferred embodiment of the invention, the system (100) includes three core components: the Profiles Management Module (101), the Divergence Module (102) and the Stimuli Generation Module (103). The Profiles Management Module (101) is responsible for acquiring and classifying the user's worldview (104), as well as managing the user's profiles (105). The Divergence Module (102) offers a way of hypothesizing extraneous data, by deliberately looking for lateral concepts or ideas and resorting to information and knowledge sources (110), and preferably stores the lateral concepts of ideas in shadow profiles (106). The Stimuli Generation Module (103) is responsible for producing stimuli (107) for the user by looking for potentially serendipitous data, using the user's profiles, divergent search queries, information spaces (109) and additional resources. The three modules are described in detail hereinafter.

In order to produce unexpected, unpredictable stimuli, the present invention makes use of a controlled random process, as disclosed hereinafter. In order to provoke the user's sagacity, the method and system described herein ought to take into consideration the user's current worldview, through the use of profiles.

Profiling the User

Traditional information retrieval methods and systems are designed to provide information that lets the user fulfill a specific concern or purpose. In order to increase the effectiveness, precision and accuracy of the outcomes, these methods and systems often use one or more profiles that model the user's current interests and preferences. The utilization of such profiles tends to produce personalized results. Focalizing on the interests of the user tends to prevent serendipity from happening. This occurs because the information provided is likely to be confined to the user's interests and preferences, thus keeping unexpected and unsought information from being discovered. And it tends to get worse because, when performing such tasks, the user does not tend to be predisposed to be aware of potentially interesting lateral stimuli. Thus, and since the present method and system are aimed at stimulating the user with serendipitous information, the profiles cannot be based on the user's interests and preferences alone. Besides the user's interests and preferences, they must also attempt to model the user's worldview.

If should be noted that "the user's worldview", as understood herein, is preferably construed to include, but not be limited to, the person's knowledge and cognition (i.e., the psychological result of perception, learning and reasoning), the person's motivation or need (i.e., the psychological arousal of the person toward a desired goal), and the person's feelings (i.e., the psychological ability to experience affective and emotional states). In other words, the user's worldview may be interpreted as the person's explicit and tacit knowledge, the whole body of all his or her past scientific, technical, artistic, philosophical, religious, social, political, emotional, personal and daily life experience, the sum of all his or her personal traits, skills, beliefs, preferences, interests, etc. In short, anything that might compose the person's cognitive individuality.

In a preferred embodiment, the user's world view is modeled with profiles. The "profile", as defined in the present invention, consists in a data model representation of the current user's worldview, preferably comprising a collection of concepts, each concept being coupled to a set of associated data. The term "concept" is construed as a symbolic representation of an abstract or general idea inferred or derived from a specific context.

Research in cognitive psychology reveals that insights seem to occur when two or more seemingly unrelated pieces of information are arranged in such a particular form that a new relationship between them is unexpectedly discovered or envisioned. Therefore, a method and system for supporting serendipitous insights ought, preferably, to separate the user's worldview in separate profiles, so that cross-fertilization of ideas from different profiles might be feasible.

In a preferred embodiment of the invention, the system makes use of at least two profiles. In fact, the profiles should preferably be as numerous as possible. Each profile is intended to model one particular reality of the user's worldview. For example, among the collection of profiles for a user, one profile may represent the user's knowledge about his or her interests in strategic management, whereas another profile may represent the user's interests on motorcycling, and a third profile may represent the user's current musical preferences. Yet, some profiles may be so abstract or diffuse in their content that no particular lexical meaning may be found for them. The condition of having at least two profiles is preferred as a means for performing cross-fertilizations of ideas, which consists in blending one or more profiles, and to achieve, as described hereinafter, (1) divergence, (2) the cross-domain integration required in the formation of insights, and (3) heuristic evaluations.

As those skilled in the art would know, if the profiles are to be generated automatically, there is the need of a method for classifying the acquired data into the profiles. There are many different methods of classifying data, and these methods are broadly described in the literature published on information retrieval and artificial intelligence, including decision trees, rule based classifiers, statistical classifiers, neural networks, bayesian classifiers, etc. Any of these or other classifiers may be used for the purpose of organizing the user's worldview into the various profiles. In a preferred embodiment of the invention, one classifier is preferably chosen to classify the acquired data from the user. The classified data is then used to update the corresponding profile or to generate a brand-new profile, when needed. In an alternative embodiment of the invention, the classification of the user's data is made by human judgment, intuition or by resorting to a thesaurus, an ontology or classification schemes, like the USPTO classification scheme or the LoC (Library of Congress) classification scheme. Although these methods for classifying the data have been presents herein, any other method for classifying the data may be utilized as well.

In an alternative embodiment of the invention, the system makes use of only one profile, which models the whole body of knowledge acquired from the user, and is intended to represent the user's worldview in its entirety. The cross-fertilization of ideas may be achieved by locating in the profile different parts of the user's worldview. This particular method of profiling the user (with a unique profile) has many disadvantages, mostly the inability to provide a systematic means of performing cross-fertilization of ideas and divergence. Nevertheless, the choice of using a unique profile alone may be forced by the specific circumstances of the particular situation, and advantages may be found in this particular embodiment. Since there is only one profile in such an embodiment, the classification of the acquired data may be dismissed, if not required.

In a preferred embodiment of the invention, the system acquires and manages the whole user's worldview, as defined hereinbefore. There are many different methods for representing the user's worldview, and these methods have been described in the literature published on information retrieval and artificial intelligence. Although the literature is prolific on modeling the user's interests and preferences, there has been some fundamental research on modeling the user's worldview as a whole. The user's worldview may be represented in various forms. For example, it may be mapped in a conceptual map, or be embodied in a semantic network, or represented as a ranking of concepts, each concept being a structured data abstraction that may include the concepts' descriptive words, a set of underlying relationships to other concepts, statistical data, and additional relevant data, or, yet more simply, it could consist of a ranking of words or terms that describe and characterize the user's worldview. Although these methods for representing the user's worldview have been presented herein, any other method of representing the user's worldview may be utilized as well.

In an alternative embodiment of the invention, the profiles reflect only a restricted part of the real user's worldview, instead of the whole user's worldview. For example, the profiles may consist in a data model representation of the user's current, past and future interests, preferences, attributes, consumption, and the like. In this particular embodiment, the profiles are likely to be convergent and may thus penalize the purpose of the current invention, leading mostly to pseudo-serendipitous stimuli instead of serendipitous ones. Despite these inconvenient attributes of the convergent profiles, there may be occasions requiring such convergent profiles, depending of the particular specificity of the situation, and many advantages may be found using convergent profiles as well. One particular advantage of using convergent profiles is that of converting the convergent profiles in anti-interests profiles, as described hereinafter, but other advantages may be envisioned as well.

Bearing in mind that the extrapolation of the user's view of the world is an inherently complex task, one possible method to work this obstacle out would be by resorting to convergent profiles, i.e., profiles that concentrate on the user's interests, but instead of using them as usual, one could use these convergent profiles as anti-interests profiles. In this particular method of using the convergent profiles, the interest profiles would be used to avoid stimuli clearly associated to the user's interests. This method of using anti-interests profiles entails a change in the usual way of regarding the profiles, inverting the logic of the profiles' usage from a centripetal (toward concepts buried within the profiles) to a centrifugal (tending to move away from the profiles) point of view. This viewpoint change may be seen, indeed, as an expected corollary of the essence of, and fitting naturally within, the scope of the present invention. Of course, such a method of using the anti-interests profiles would increase abruptly the degrees of freedom of the quest for stimuli, since the universe of possible stimuli is now freed from the restraining usual usage of the profiles (actually, all the stimuli but those related to the profiles are now considered valid). In a particular embodiment of the invention, the profiles are regarded as anti-interests profiles, as described in this paragraph.

Alternatively, the profiles could be used in both ways, i.e., as usual profiles and as anti-interests profiles as well, simultaneously. In this particular method of using the profiles, in addition to using the profiles to guide the wandering/search for stimuli by the Stimuli Generation Module, as described hereinafter, those very profiles (now regarded as anti-interests profiles too) are also used to eliminate possible stimuli that fall into the user's interests, thus providing a way of preventing from presenting the user with obvious, known or sought pieces of information. Moreover, by using the very same profiles as usual profiles and anti-interests profiles simultaneously, one can easily attain the desired goal of finding stimuli that are, simultaneously, conspicuous to the user (because they are located near the user's interests, somewhere in a centrifugal path departing from the profiles) without being expected (because they are certainly outside the user's known interests sphere). In a particular embodiment of the invention, the profiles are used as usual profiles and anti-interests profiles simultaneously, as described in this paragraph.

The user's worldview may be acquired by the system in two forms: explicit and implicit. In a preferred embodiment, the user's worldview is implicitly inferred from the observation of the specific behavior of the user. For example, the system may observe, in the broad sense, the user's actions while interacting with an information space, like the Internet or a virtual online store.

The term "information space", as used herein, is construed to include, but not to be limited to, the Internet, a database, a knowledge base, a semantic network, a conceptual map, a thesaurus, or any repository of unstructured, semi-structured or structured data.

In the Internet example, the pages viewed, the selected links, the URL stored as bookmarks, the paragraphs read, and all kind of specific additional observations may be used as hints about the user's experienced worldview. In the virtual online store example, the user's worldview may be inferred from the searches performed in the online catalog, the products bought, added to the wish list, or simply consulted, etc. As can be easily pointed out by those skilled in the art, methodological and technical limitations may prevent from having profiles that describe accurately the user's real worldview, apart from the inherent complexity of extrapolating the user's worldview from his or her behavior. In a preferred embodiment of the invention, the profiles are ideally built to reflect, as much accurately as possible, the real user's worldview. In an alternative embodiment of the invention, some concepts of the profiles may not be related to, nor be considered relevant to describe accurately, the real user's worldview. Even so, unrelated, unexpected, and even wrong concepts are considered important and welcome in the generation of the user's profiles, as those profiles are intended to be used in the discovery of serendipitous stimuli.

In an alternative embodiment of the invention, the profiles are explicitly updated by the user. In this particular embodiment, the user feeds the system with specific pieces of information about his or her worldview. For example, the user may send to the system, e.g., via email or by filling an online form, a descriptive text or some URLs of web pages considered relevant regarding one or more particular aspect of his or her worldview. This method of acquiring information about the user's worldview may have the advantage of being, at least in principle, more accurate than its automatically generated counterpart. However, the method of requiring the user to explicitly update the profiles suffers from several weaknesses. First, requiring the user to directly update the profiles has the disadvantage of forcing the user to act unnaturally, namely by pushing him or her to reflect upon his or her own worldview, which can lead to a distorted, biased reality. Secondly, by being directly updated by the user, the profiles are likely to be incomplete, since the user tends to be aware of particular, but not all, aspects of his, or her, own worldview. This tends to prevent the profiles from modeling the user's tacit worldview, which is acknowledged to have an important role in the formation of serendipitous insights. Finally, since they are based on what the user is aware of his of her worldview, the profiles are likely to be convergent, i.e., limited to the user's interests and preferences, which, as described hereinbefore, is an important condition that tends to prevent serendipity from happening. In this particular embodiment, the user may be required to classify the information he or she provides to the system. Alternatively, one classifier may be chosen to classify the data explicitly provided by the user, as described hereinbefore.

In an alternative embodiment of the invention, the profiles may be acquired both implicitly on behalf of the user and explicitly updated by the user, whereas both methods may operate simultaneously or asynchronously, according to the specificity of the particular situation.

In a preferred embodiment of the invention, an additional step of data acquisition is performed to achieve divergence. In this particular embodiment of the invention, the Divergence Module is preferably invoked to produce a collection of lateral concepts or concept structures, following a divergent method, as described hereinafter. The newly additional lateral concepts or concept structures may be used in one of two forms: either to update the corresponding profiles directly or to improve a corresponding shadow profile, as described hereinafter.

In the following paragraphs, one particular method is described that may be used to represent the user's worldview. This is provided only as an example and is not intended to limit the invention to the use of the method specifically described.

In a particular embodiment of the invention, the profiles are represented as n-dimensional index vectors of weights, n being the number of distinct relevant concepts in a profile—a well-known approach that has been broadly described in the literature published on information retrieval. The weights represent the importance of the corresponding concept for the characterization of the content of the profile. Each profile is represented by its particular index vector, which is typically normalized. A simple method of implementing the index vectors of concepts is through rankings of concepts. A ranking of concepts may be a data structure, a file or a set of database tables containing a collection of concepts and the underlying information regarding their relative importance or relevance as descriptive units of the corresponding profile.

In this particular embodiment of the invention, a concept is a symbolic representation of an abstract or general idea inferred or derived from the data acquired from the user, either implicitly or explicitly. One particular implementation of such concepts is provided by WordNet, a lexical database for the English language, whose design was inspired by psycholinguistic theories of lexical memory. Each individual lexical concept is represented by a synset, which is univocally identified by a synset ID and stored along with a set of underlying relationships to other concepts, thus forming a conceptual map. Furthermore, each concept is described by the set of synonyms (hence its name "synset") that allows the full disambiguation of homonyms. For example, Table 1 shows the WordNet meanings associated with the word "file":

TABLE 1

| Synset | Gloss |
| --- | --- |
| File, data file | A set of related records (either written or electronic) kept together. |
| File, single file, Indian file | A line of persons or things arranged one behind the other. |
| File, file cabinet, filling cabinet | Office furniture consisting of a container for keeping papers in order. |
| File | A steel hand tool with sharp teeth on all or some of its surfaces; used for smoothing wood or metal. |
| File, register | Register in a public office or in a court of law. |
| File | Smooth with a file. |
| File | Proceed in file. |
| Charge, lodge, file | File a formal charge against. |
| File, file away | Place in a file. |

In this particular embodiment of the invention, the Profiles Management Module preferably acquires the user's worldview while he or she interacts with information spaces. For example, while the user navigates through the Internet, the system may analyze the web pages browsed by the user, retrieving particular elements from those pages that might characterize the whole web page. Examples of such elements include the page's title, the summarization of the body of the document, the text headlines, the embedded links, etc. While on a virtual online store, the system may infer the user's worldview by analyzing his or her consumption history, the products added to the wish list, the entries in the catalog that were visited, etc.

A document, as used herein, is construed to include, but not to be limited to, any unit of information in any domain, for example, a web page, a commodity data sheet, a record of product attributes, a scientific article, a patent application, and anything with intelligible properties that can be used to characterize the user's worldview.

The analysis of such documents preferably includes the analysis of the textual material therein. Constituent relevant words are extracted and converted into concepts. This conversion may be achieved by resorting to WordNet, which, coupled with a disambiguation procedure, provides an easy means of retrieving the synset's ID. There are many different methods for word sense disambiguation, and these methods are described in the literature published on information retrieval and artificial intelligence. In this particular embodiment of the invention, a disambiguation method is preferably chosen and used to disambiguate the words. Once the words are disambiguated, the corresponding synset ID is retrieved from WordNet.

The resulting synsets may then be ordered by their relevance regarding the characterization of the document. Many different methods exist for calculating the weight of the index vector constituents, and these methods have been described in the literature published on information retrieval. In this particular embodiment of the invention, a method for calculating the weights of the index vector constituents is preferably chosen and used therefore. Synsets with higher importance in characterizing the document's content are assigned higher weights. The resulting index vector, coded as a ranking of synsets, is expected to sketch, in an approximate likeliness, the corresponding analyzed document, and therefore, the user's experienced information environment. As those skilled in the art would know, methodological and technological limitations, apart from the inherent complexity of extrapolating the user's worldview from his or her behavior, may prevent from generating accurate profiles for the user, despite the effectiveness of the methods employed. Nevertheless, the nature of serendipity exempts the method and system disclosed herein from a perfect accuracy, since one can never tell that unrelated, unexpected, and even wrong concepts would not be important for the formation of serendipitous insights.

In this particular embodiment of the invention, the rankings of concepts preferably consists of n rows of data, whereas each row of the profile contains data about one synset, e.g., the synset ID, the synset's descriptive words, the synset's normalized weight, the synset's frequency (i.e., the number of times the synset was found in all the documents analyzed so far), the synset's document frequency (i.e., the number of documents analyzed that contained the synset), and any additional relevant data.

Upon building the ranking of synsets, the Profiles Management Module preferably identifies the pertinent profile to which the newly built ranking of concepts is to be added. This identification may be easily accomplished by resorting to a classifier, as described hereinbefore. If no pertinent profile is identified, as when the content of a document is unrelated to any previously analyzed document, a brand-new profile may be created to accommodate the concepts in the newly built ranking of synsets.

Once the pertinent profile is identified, it is preferably updated with the newly acquired synsets. This procedure, which is often designated "machine learning" in the literature published on artificial intelligence, performs a more or less complex integration of the new information with the already existing one, which stands in the profile. In this particular embodiment of the invention, a learning method is preferably chosen and used to update the profile with the information contained in the ranking of synsets. A particularly simple method of updating the profile consists of adding the weight of each synsets in the ranking with the weight of the corresponding synset in the profile, provided that both the ranking and the profiles are normalized. Synsets of the ranking that do not have a corresponding peer in the profile are simply included in the profile. The resulting updated profile is then normalized. A variant of this simple method of updating the profile includes a learning rate, which indicates the sensitivity of the learning process to novel information, and a relevance feedback factor, which allows the user to correct the learned data. Both the learning rate and the relevance feedback methods are broadly described in the literature published on information retrieval.

In one particular embodiment of the invention, an additional step of data acquisition may be performed. In this particular embodiment, the Divergence Module is invoked in order to encounter potentially interesting lateral information, which can therefore enrich the ranking of concepts with unsought, unexpected, unrelated, lateral data. The Divergence Module is described in detail hereunder. The encountered lateral synsets may then be added to the previously acquired data from the user, which is already embodied in the ranking of synsets, or be used to build a corresponding shadow profile, as described hereinafter.

Divergence.

One of the most important features of the present invention is divergence, i.e., the ability to render information beyond our second nature of considering only what is believed to be relevant for a particular situation and of discarding what is supposedly irrelevant. The convergent stereotype of finding, acquiring and consuming information in an analytical and selective way is acknowledged to be one of the most important reasons why serendipity is so often overlooked or unnoticed. Divergence is both a method and an attitude. The success of the present invention depends not only on its specification, but also on the attitude of the user toward the divergent stimuli generated by the system.

Figure 2:
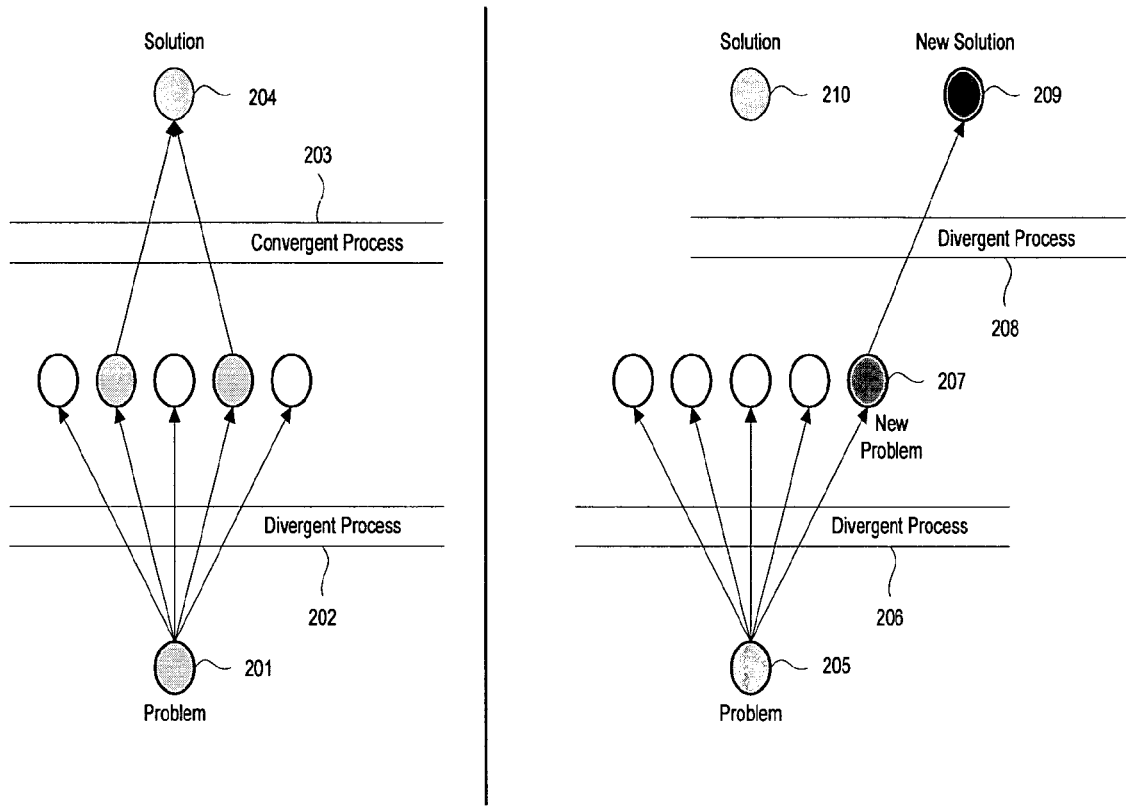
FIG. 2 depicts the differences between the convergent and the divergent ways and attitudes of regarding information.

FIG. 2 illustrates the differences between the two methods and attitudes of regarding information. The typical convergent method and attitude toward information commences with the awareness of a problem (201), engages in some sort of divergence (202), and finally ends up converging (203) into a solution (204) to the problem at hand. The divergent method and attitude toward information, though also pursuing the solution for an actual problem (205), follows an essentially divergent path (206 and 208) toward an unexpected new problem (207), or, as it is often the case, toward the solution (209) of a problem we were not even aware of. Frequently, the initial problem (205) is forgotten, as well as the solution (210) sought to solve it.

Current information retrieval methods and systems, in particular, and computer science in general, are strongly driven toward convergence, focusing their efforts on providing the user with accurate responses to his or her desire or need. In such conditions, serendipity tends to fade out, usually occurring as a mere by-product, when it is not regarded as an unfortunate side effect, of the mainstream strategies of handling information. Serendipity occurs as a by-product, e.g., when an individual is browsing the Internet and finds something interesting he or she was not looking for. Indeed, any information space, ranging from a city street to the Internet, may promote, by its nature, the happening of serendipitous events. However, the probability of interesting unsought information to pop up from the information space is very low. Without a method of looking deliberately for lateral information, i.e., information that is not central to the known concerns of the user, any method or system is likely to be convergent, i.e., captive of the user's concerns, especially when interests and preference profiles are used. Thus, there is a need for a method of impelling the quest for serendipitous information toward unexpected, unfamiliar areas of the information space, though without discarding the need of conforming to the user's sagacity.

Some methods and systems have been devised to loose this restraining obstinate focalization, like the U.S. Pat. No. 6,334,127, some recommender systems, some agent-based systems and some methods for data mining systems, etc., but have only reached up to the pseudo-serendipitous tier. Either their outcomes are circumscribed to the user's concerns or there is a deliberate intention to find something using the system, even when some particular unsought piece of information is unexpectedly found. Other methods and systems have been devised to provide the user with information beyond the knowledge areas for which the user is familiar, like the U.S. Published Application No. 20030093421, social filtering systems, etc. However, some of these systems are pseudo-serendipitous, others are deterministic: either there is a deliberate intention to find something unsought while using the systems, or there is the lack of randomness that allows predicting, with a fairly acceptable accuracy, their outputs by analyzing carefully their inputs, or, yet, their outcomes are totally or partially related to the user's current concerns. Serendipity means that the finding is totally unsought, totally unexpected and totally unforeseen, i.e., the unsought finding has nothing to do with the current or past concerns of the user and cannot be anticipated by any means.

In order to present the user with truly unsought, unexpected, unforeseen information, the system and method disclosed herein use (1) a controlled random process, scattered in particular points in time, of the process of generation of stimuli, as described hereinafter, and (2) a divergence process, which goal is to diverge from the user's worldview by a variety of means.

In a preferred embodiment of the invention, the divergence is accomplished by the Divergence Module, which may be requested by other processing components when needed or operate as a background process that performs the divergence continuously and gradually. Regardless of its usage mode, the main goal of the Divergence Module is to enrich the knowledge acquired about the user's worldview. This enrichment is preferably divergent, i.e., composed of lateral knowledge elements that are not central to the user's worldview, neither explicitly provided by, nor implicitly inferred from the behavior of, the user. This enrichment is not intended to lead to more accurate profiles about the user's worldview, but exactly the opposite: unknown, unexpected, unforeseen, surprising knowledge is welcome and preferred.

One particular feature of the divergence methods is their divergence scale, which may be represented by a divergence rate d, where $0<d<1$. Preferably, d should be neither 0 nor 1. If $d=0$, the divergence methods are non-divergent, i.e., they are deterministic, which would deny serendipity. $d=1$ means the divergence methods are purely random, neglecting the important role of the user's sagacity. Such a random method of diverging is precisely offered by any information space, ranging from libraries to the Internet. As d tends to 0, the divergence methods are likely to select the very concepts surrounding the user's worldview, providing secure knowledge elements that are likely to conform to the user's sagacity, though not much surprising. A divergence rate d near 1 would lead to more unpredictable knowledge elements, to areas of the information space far distinct from the user's worldview, thus providing more surprising, unexpected knowledge elements, though perhaps not so suitable to seize the user's attention. The divergence rate d should preferably be tuned for the particular specificities of the embodiment of the invention and adjusted to fulfill the desired scale of divergence, either manually or automatically.

In order to behave in such a divergent way, the Divergence Module preferably requires (1) one or more information or knowledge sources, with which the search for lateral elements could be done and (2) special methods of discovering divergent knowledge.

Without limiting the scope of the invention, some methods for diverging from the user's worldview are described as follows.

One particular method of performing divergence would be by looking for concepts not explicitly nor implicitly acquired during the learning process. If the information space is structured or semi-structured, such extraneous concepts may be obtained by expanding the nodes of information that were used to build the profiles. In a particular embodiment of the invention, the information space used to create the profiles is also used to perform divergence. For example, if the information space used to build the profiles is the WWW, the profiles are built by retrieving some characterizing elements from the viewed web pages, such the page's title and the text body. In this particular situation, the pages are expected to include links to other web pages that are, typically, related in some aspect to the current web page, although the strength of such link relations may vary from strong to subtle. Instead of being viewed as a weakness, the ambiguous link strength between the web pages may be regarded as an advantage, since unforeseen concepts may be encountered unexpectedly, though some underlying semantic association is likely to be present. In this particular method of diverging, the linked web pages might be learned into the profiles, following a method much similar to that of building the profiles. Alternatively, the lateral concepts might be stored elsewhere, outside the corresponding profiles, e.g., in a corresponding shadow profile, as described hereinafter.

Another method of achieving divergence would be by resorting to structured knowledge sources, like WordNet, thesaurus, databases, knowledge bases, and the like. In a particular embodiment of the invention, one structured knowledge source is preferably chosen to perform divergence. Since the profiles encode particular concepts which characterize the user's worldview, and those particular concepts are expected to be attached somewhere in the conceptual map or conceptual structure of the chosen structured knowledge source, one may use the structural relations between the knowledge elements of the structured knowledge source to envision lateral elements. These subtly related lateral elements may then be used either directly to enrich the profiles or as resources to produce further laterality, according to the divergence rate specified hereinbefore. For example, using a thesaurus, one might look up for the word "strategic", go to the related word "preparation", then to "cooking". For example, by resorting to WordNet, one might use the coordinate relations to find out that {battle plan}, {tactic, maneuver} and {travel plan, itinerary} are coordinate concepts of {strategy}. In this particular method of diverging, the lateral concepts might be learned into the profiles, following a method much similar to that of building the profiles. Alternatively, the lateral concepts might be stored elsewhere, outside the corresponding profiles, e.g., in a corresponding shadow profile, as described hereinafter.

Yet another method of attaining divergence would be through the use of metaphors. There are many different methods of processing computational metaphors, and these methods are described in the literature published on computational metaphors and artificial intelligence. Computational metaphors might be used in order to look up for structural patterns of knowledge elements scattered through the conceptual map or structure. These methods require, thus, an additional structured knowledge source, like WordNet. The patterns of concepts might consist in clusters of concepts linked to each other through conceptual relations. Starting from patterns of concepts located in the profiles and across the profiles (some of them being possibly incomplete, disconnected, disjointed, incoherent, and distributed throughout the profiles), the method would look up in the structured knowledge source for similar patterns of concepts, from which lateral elements would be retrieved and used to expand the original patterns within the profiles, thus producing plausible coherent expansions of the patterns of concepts in the profiles. In this particular method of diverging, the lateral concepts and metaphors might be learned into the profiles, following a method much similar to that of building the profiles. Alternatively, the lateral concepts and metaphors might be stored elsewhere, outside the corresponding profiles, e.g., in a corresponding shadow profile, as described hereinafter.

Yet another method of performing divergence is by resorting to inference engines or inference methods. There are many different systems and methods of performing inference, and these methods and systems are broadly described in the literature published on artificial intelligence. By resorting to inference engines or methods, one might infer, through deduction, induction or, preferably, through abduction, additional lateral elements not considered during the learning process of the profiles. This method of performing divergence preferably requires an additional structured knowledge source or knowledge base. For example, by resorting to abduction, one might find a set of concepts that—together with the background general knowledge provided by the structured knowledge source or knowledge base—allows deriving other concepts, mainly when "entailment relations" are present in the structured source of knowledge or knowledge base. In this particular method of diverging, the lateral inferred concepts and inference structures might be learned into the profiles, following a method much similar to that of building the profiles. Alternatively, the lateral inferred concepts and inference structures might be stored elsewhere, outside the corresponding profiles, e.g., in a corresponding shadow profile, as described hereinafter.

Although these specific methods of performing divergence are presented herein, any other method of performing divergence may be utilized as well.

While the aim of the Divergence Module is, in the broad sense, to hypothesize extraneous lateral data based on the user's profiles and additional information or knowledge sources, the hypothesized data may be appended to the existing body of knowledge about the user's worldview in two main forms: by infusion or by shadow. In the infusion mode of diverging, the very profiles of the user are updated with the new lateral concepts, thus becoming permanently modified. In the shadow mode of diverging, a shadow profile is build to comprise all the divergent material produced by the Divergence Module regarding the expansion of the profiles. Thus, the shadow mode of diverging provides a means of hypothesizing extraneous data, though without affecting the integrity of the profiles of the user: both the convergent knowledge learned from the user and the divergent knowledge derived therefore, are logically stored in separate profiles. Although the infusion mode of divergence is simpler to implement than its shadow counterpart, its utilization tends to produce cluttered profiles over time, whereas convergent and divergent knowledge is indistinguishable, thus leading to a loss of control over the whole processes of learning and diverging.

In a preferred embodiment of the invention, the Divergence Module generates one or more shadow profiles for each user profile. Each shadow profile is intended to contain divergent, lateral, extraneous, unexpected, hypothesized, surprising knowledge, based on the very concepts of the user's profiles. The shadow profiles are built using one or more methods of diverging, as described hereinbefore. One important feature of the shadow profiles is their essential relation to the divergence rate d, described hereinbefore. Using a metaphorical image, while d is near 0, the shadow profile is expected to be narrow, mainly located around the corresponding profile, much like if a light source was beaming up above the profile. In the other hand, a d near 1 is similar to a light source shining far away above the skyline, thus forming long, vague, amorphous shadows, not quite distinctive of the corresponding profiles, but far more promising of containing much more interesting, unfamiliar concepts. Additionally, in many light sources would be present, the shadows might overlap each other, forming cross-over areas of the divergent knowledge about the user's worldview.

In the following paragraphs, one particular method is described that may be used to perform divergence, following the example of the profiles of synsets described hereinbefore. This is provided only as an example and is not intended to limit the invention to the use of the method specifically described.

In one particular embodiment of the invention, the divergence is achieved both during the generation of profiles and the generation of stimuli. Regarding the generation of profiles, the Divergence Module is used in two distinct ways. In the one hand, the Divergence Module is explicitly requested by the Profiles Management Module to enhance the knowledge acquired about the user. In the other hand, the Divergence Module runs continuously as a background process and adds any new piece of knowledge whenever it is discovered. While in the generation of stimuli, the Divergence Module is explicitly invoked by the Stimuli Generation Module to deliberately look for lateral concepts that might be used to create the search string.

In this particular embodiment of the invention, the Divergence Module is requested to enhance the profiles during the learning process by looking for lateral data. Since in this particular embodiment, the profiles are built as rankings of synsets, whereas the synsets are acquired through the analysis of the web pages, the embedded links thereon are used to reach lateral web pages not explicitly considered during the learning process. Those lateral web pages are expected to contain knowledge element not tightly related to those in the original web page, though some underlying semantic relation are likely to be present between the linked web pages. The linked web pages are, thus, analyzed, and the corresponding synsets stored in a shadow profile, as described hereinbefore. The lateral pages are expected to contain links to other pages, thus providing an effective way of extending the scale of divergence: a low divergence rate d would lead to traverse only the web pages closer to the initial web page, while a high divergence rate d would lead to web pages far away from the initial web page.

In this particular embodiment, the Divergence Module is also used in a background fashion. While the remaining modules of the system are pursuing their goals, the Divergence Module engages in a continuous, persistent background process with the aim of discovering potentially interesting pieces of knowledge not yet considered. This background process is achieved by computational metaphors and inference engines, which dig up knowledge buried in the profiles (including the existing shadow profiles), and tries to uncover potentially interesting new elements by resorting to external structured knowledge sources like WordNet. The discovered elements are, then, added to the appropriate shadow profiles.

While in the generation of stimuli, which is described hereinafter, the Divergence Module is invoked to discover lateral elements not yet encoded in the profiles. This process may be attained by resorting to WordNet. In one particular embodiment of the invention, the divergence may be accomplished by sporadic replacements of some of the entry point synsets by others related ones. The choice of the new, lateral synsets may be based, for example, on the WordNet relations between synsets, including the hypernym relation (also known as "generalization"), the hyponym relation (also known as "particularization"), the antonym relation, the meronym relation (also known as the "part of" relation) and the coordinate relation (synsets of equal importance, rank, or degree, i.e., having the same hypernym), etc. For example, the synset {inventor, discoverer, artificer} is coordinate to {architect, designer}, {artist, creative person}, {choreographer} and {farmer, granger}, with hypernym synset (are a kind of) {creator}. Additional relations between synsets may be foreseen by resorting to the actual relations of WordNet, e.g., by appending two or more WordNet relations together. The WordNet relations offers an easy and effective way of diverging toward lateral synsets not explicitly submitted by the user nor implicitly inferred from the user's behavior, by making little jumps into areas of the information space not considered in the profiles. It is noteworthy to point out that these jumps are not blind. Instead, they represent soft leaps to adjacent concepts on the information space that surround the very concepts of the user's view of the world. Nevertheless, the scale of the divergence may be enhanced by setting up d to a higher value.

Generation of Stimuli

The generation of stimuli is preferably performed by the Stimuli Generation Module. One intrinsic characteristic of serendipity is that of being bound both by chance and the person's sagacity. While chance may be attainable, e.g., by random processes, the person's sagacity may be provoked by a stimulus that conforms to the user's worldview which is, hopefully, buried within the profiles. The Stimuli Generation Module is preferably responsible for both (1) producing unexpected stimuli, and (2) ensuring that the produced stimuli will seize the user's attention.

Although interesting stimuli could still be generated even ignoring the user's worldview, those stimuli wouldn't be anything more than blind luck. Blind luck based serendipity is inherent to any system dealing with information spaces, like the Internet, virtual online stores, and the like. Methods and systems truly devised to deliberately support serendipity should do something more than just relying on chance. Additionally, without a careful consideration of the user's worldview, any stimulus is likely to pass unnoticed in front of the user. That is the reason why the present invention devotes a great deal of attention to the appropriate usage of the profiles, as described hereinbefore.

The generation of stimuli preferably comprises two main stages: the generation of the stimulus itself and the evaluation of the stimulus, i.e., the estimation of the likeliness that the stimulus will seize the attention of the user. These two stages are preferably performed one along with the other, since a serendipitous stimulus can't be considered totally effective without seizing the user's attention. In a preferred embodiment of the invention, the Stimuli Generation Module uses the profiles as the main raw material for the generation of stimuli. By resorting to the profiles, it is expected that the stimuli will most likely grab the user's attention. Profiles may be used by the Stimuli Generation Modules in various forms.

In one particular embodiment of the invention, the generation of stimuli is preferably achieved by choosing some particular elements from the available profiles to form a set of entry points (hereafter represented by E), upon which a deliberate search for laterality may be performed, conducing to a set of lateral elements L. In this particular method of generating the stimuli, the sets E and L are then preferably merged in a variety of means, resulting in the set S of source elements, which are then preferably used to discover stimuli in an information space.

In a preferred embodiment of the invention, the generation of the entry points E set preferably consists in picking up some elements from the available profiles (including the shadow profiles, as needed or desired), through a controlled random process or any alternative means. For example, a random number i of profiles may be randomly chosen as a source profiles (hereafter represented by P). It should be noted that the selection of P is expected to be a first step toward the desired cross-fertilization of ideas mentioned hereinbefore. From those P profiles, a random process D may be used to select a random number j of elements from P, thus providing a set of profile elements, entry points, E. The random process D may follow a specific random distribution or another method of controlling the bias of the random process of selecting elements from the profiles. Biasing the random process of selecting the element from the set P of profiles has the advantage of allowing the nonlinear selection of elements, for example, concentrating on the most relevant elements of the profiles, though without discarding the least relevant ones, thus letting some nonobvious, less relevant elements to be part of the set of entry points E.

Upon selecting the E set of profile elements by a variety of means, the generation of stimuli preferably endorses a deliberate search for laterality, whose goal is to enrich the E set of entry points with extraneous, unexpected data. The deliberate search for laterality is performed by the Divergence Module, which is described in detail hereinbefore. From the deliberate search for laterality, a set L of lateral elements is created. The elements of E and L may then be merged in various manners: (1) L may be entirely or partially added to E; (2) L may replace totally or partially E; or (3) some elements of L may replace some elements of E. Upon merging E and L, the set S of source elements is finally created.

Upon creating the source elements set S by a variety of means, this particular method of generating the stimuli preferably engages in a search for nodes of information that might represent a potential stimulus for the user.

It should be noted that the concepts of "search for nodes of information" and "search for stimuli", as used herein, are to be understood both as intentional and unintentional, depending on the particular situation, i.e., the intentional mode of search is regarded as a search process deliberately driven toward latent stimuli, whereas the unintentional mode of search is viewed as a sort of wandering process, without any clear destination but with the capacity of being aware of latent stimuli when such stimuli come across the wandering path. A node of information, as used herein, is construed to include, but not to be limited to, an Internet WWW page, an entry in an online catalog, a record of product attributes, a patent application publication, etc.

The elements of S are preferably transformed by a variety of means, depending on the elements' structure or nature of the information space, into a search string, which, e.g., may be arranged using boolean connectors, like AND, OR, etc., to connect the elements together in the search string.

Although a boolean search string is presented herein as an example, any type of search string and search method may be utilized. There exist many different methods of performing the search in information spaces, like using search engines, database engines, etc. Depending on the structure and nature of the information space, a search method is preferably chosen to perform the search for nodes of information suitable of becoming stimuli.

Depending on the nature and structure of the information space, the search may be performed gradually or at once. For example, if the information space is the Internet, the search for nodes of information (e.g. web page) is much like a wandering process and may be performed by traversing the web pages along the links embedded within the visited web pages. If, on the other hand, a database is chosen as the information space, a query may return a record set directly. Upon performing the search for nodes of information in the information space, the Stimuli Generation Module preferably carries out the evaluation of some or all nodes of information retrieved during the search. The evaluation of the nodes of information is preferably required as a means of estimating its potential at provoking the user's sagacity, i.e., the likeliness of seizing the user's attention once the stimulus is presented to the user. The evaluation of the nodes of information may be implemented in a wide variety of means, and some relevant methods of achieving the evaluation of the nodes of information have been described in the literature published on information retrieval, under the designation of "similarity measure", and in the literature published on artificial intelligence, under the designation of "heuristic evaluation", "heuristic function" or simply "heuristics".

In a preferred embodiment of the invention, the evaluation of the nodes of information is implemented as a heuristic function that assigns a higher value to the nodes of information that are likely to be better serendipitous stimuli. By using a heuristic function, the wandering/search process is likely to be enhanced in several dimensions. First, the wandering/search path expected to be directed toward more promising areas of the information space where latent stimuli are most likely to be located. Secondly, the evaluation of each node of information provides a means of assessing if it is suitable as a serendipitous stimulus, thus providing a per-node quality measure. Finally, by being heuristic in its nature, the heuristic function does not assure perfectly accurate results: instead, some vagueness is permitted and may indeed be enforced, so that the unexpectedness of the stimuli may prevail.

One particular method of implementing the heuristic function consists in assigning higher values to nodes of information that better match the elements of at least two profiles simultaneously. For example, if the user's worldview comprises two profiles, one related to strategic management and the other being about the user's liking for motorcycling, then appropriate heuristic function would assign a high value to a book recommendation on, e.g., strategic techniques of driving motorcycles. By calculating such heuristic function to assess the quality of the nodes of information, it is expected that the desired cross-fertilization of ideas is suitably attained, as mentioned hereinbefore, through the cross-domain integration of the profiles. For example, one particular method of implementing the heuristic function consists in blending two or more profiles and calculating the similarity measure between those blended profiles and the node of information. For example, if the profiles are encoded as index vectors of concepts, blending two or more profiles may consist in calculating the sum of the corresponding index vectors. By blending two or more profiles, a new, distinct profile is generated, which is likely to represent the cross-domain integration of different aspects of the user's worldview. Then, a similarity measure may be calculated between this newly generated blended profile and the node of information. In a particular embodiment of the invention, the heuristic function is implemented as described in this paragraph.

In an alternative embodiment of the invention, a collection of blended profiles is created, instead of just one blended profile. In this particular embodiment, a random number h is used as the number of profiles to blend together: all of some combinations of h profiles are selected and blended together, leading to a collection of blended profiles Bh. Upon generating the set of blended profiles Bh, a heuristic function may be calculated using each blended profile of Bh and the node of information, and the best of all heuristic values is assigned to the node of information.

Another method of implementing the heuristic function consists in using metaphors, i.e., by matching structural patterns of concepts in the conceptual map that is embodied in the profiles. The metaphor heuristic function would preferably attempt to match structural patterns across different profiles in order to support the desired behavior of cross-fertilization of ideas. There are many different methods of processing metaphors, and these methods have been described in the literature published on computational metaphors and artificial intelligence. For example, if the user's worldview comprises two profiles, one related to strategic management and the other being about the user's liking for motorcycling, then an appropriate metaphor heuristic function would assign a high value to a suggestive metaphor like, e.g., "motorcycling is not a task, but a rather a set of managerial skills", or "motorcycling is the application of strategic thinking", or yet "motorcycling is a dynamic process of aligning strategies and performance". Alternatively, the heuristic function may be implemented using analogies, i.e., by finding analogical concepts and structural patterns of concepts in different parts of the various profiles. There are many different methods of processing analogies, and these methods have been described in the literature published on computational analogy and artificial intelligence. In a particular embodiment of the invention, the heuristic function is implemented as described in this paragraph.

Yet another alternative method of implementing the heuristic function consists in using inference engines to infer, by deduction, induction or, preferably, by abduction, the adequacy of the node of information toward serendipity regarding the user's worldview. For example, the heuristically evaluated quality of a node of information may be by assessing its novelty degree coupled with the inferred adequacy of the node of information toward an unsought, unexpected key element that could explain a chain of concepts connecting two or more concepts across one or more profiles. For example, the inference engine might infer that the concept of "itinerary" or "travel plan" is a suitable concept connecting two profiles of the user—one profile about strategic management and another about motorcycling. In a particular embodiment of the invention, the heuristic function is implemented as described in this paragraph.

Although index vectors summation, metaphors, analogies and inference engines are presented herein as examples of implementing the heuristic function, any other method of implementing the heuristic function may be utilized as well.

The wandering/search for nodes of information may go on indefinitely. In a preferred embodiment, the wandering/search is quality and time limited by thresholds. This measure of limiting the wandering/search process prevents the search from remaining indefinitely in the same trail or getting stuck in a local maximum. Alternatively, the search for nodes of information may be stopped under other conditions not specified herein, depending on the specificity of the particular situation.

When the wandering/search is over, a set containing the k-best-ever nodes of information is presented to the user as stimuli, where k is preferably set to a value adjusted to the specificity of the particular embodiment of the invention. As described hereinbefore, the quality of a node of information is estimated by the heuristic function. The particular way by which the k nodes of information are presented to the user depends on the specificity of the particular embodiment of the invention. For example, if the present invention is embodied as a serendipity add-on to a search engine, the k stimuli may be presented to the user as an alternative list of URL (links) to potentially interesting unsought pages, regarding to the user's worldview. Alternatively, if for example the present invention is coupled to a virtual online store, a limited set of stimuli may be presented to the user as a list of recommended products that are not intended to fit the user's current or past interests or preferences, but are potentially interesting enough to deserve some particular attention from the user. Additionally, some subliminal captology techniques might be employed to persuade the user of the importance of relevance of the serendipitous stimuli. There are many different methods of persuading the user of the relevance of the information, and these methods are described in the literature on captology and human-computer interaction.

In the following paragraphs, one particular method is described that may be used to generate the stimuli, following the example of the profiles of synsets described hereinbefore. This is provided only as an example and is not intended to limit the invention to the use of the method specifically described.

In a particular embodiment of the invention, some profiles are picked up randomly (P). The number of selected profiles is preferably greater than two and may include all the profiles. From the chosen profiles P, a random number j of synsets is selected as entry points (E). The selection of the entry points may follow, e.g., the exponential distribution with a specific mean as parameter, which may be defined empirically or automatically by resorting to statistical calculations (e.g., the mean of the concepts weights). By following the exponential distribution instead of a uniform distribution, the selection of entry points concentrates on the most relevant synset within the ranking (profile), though without discarding the least relevant ones. Although the exponential distribution has been presented herein as an example of a process of biasing the selection of entry points, another distribution or alternative method of biasing the selection of entry points may be utilized.

Even though some least relevant synsets are also picked up occasionally during the selection of entry points, there may be the tendency to select the same synsets again and again, mainly when the profiles are scarcely populated. This obstinate focalization may lead to impoverished convergent searches, which may penalize the purposes of the present invention. In a preferred embodiment of the invention, a deliberate search for laterality is preferably performed by the Divergence Module, as described hereinbefore. The Divergence Module produces a set of lateral synsets, which would replace some randomly selected entry points, to generate the source set of synsets (S).

Upon selecting the source synsets S, a search string is preferably created by concatenating some or all of the descriptive word of the synsets with boolean connectors. For example, if the source synsets are {strategic, strategical}, {motorcycling} and {drift}, then the search string would be, e.g., "(strategic OR strategical) AND motorcycling AND drift". The search string is then preferably used to issue a search query to an Internet search engine, which is expected to return a set of URL of web pages matching the query string.

In this particular embodiment of the invention, upon receiving the set of URL from the search engine, a set of parallel wandering processes in the web is launched. Each wandering process starts visiting one of the URL returned by the search engine and recursively traversing the graph of web pages. The wandering processes are preferably accomplished through a best-first search, guided by a heuristic function, through the graph of pages linked to each other. In this particular embodiment, each visited web page is transformed into an index vector, which is implemented as a ranking of synsets, following the same process of creating the profiles.

In this particular embodiment, the heuristic function preferably evaluates the cross-domain integration of the page, which is achieved by blending g profiles into a new, distinct profile B. The value of g may be determined empirically or automatically calculated. As in this particular embodiment of the invention the profiles are represented as rankings of synsets, each ranking consisting of several rows of data, each row comprising the synset ID and additional statistical data, the blending of profiles consists in calculating the sum of the weights of the corresponding synsets. Synsets that do not have a corresponding peer in the other profiles are simply included in the final blended profile, which is normalized at the end of the blending process. By blending g profiles, a new, distinct profile is generated, which is likely to represent the cross-domain integration of different aspects of the user's view of the world represented by those g profiles. Upon generating the blended profile B, a heuristic function may be calculated using the blended profile B and the current web page, and the value calculated by heuristic function is assigned to the web page.

In this particular embodiment of the invention, the heuristic function may be implemented as a similarity measurement between the blended profile(s) and the web page. As described hereinbefore, both the profiles and the web pages consist of index vectors of synsets implemented as ranking of synsets. There are many different methods of calculating the similarity between index vectors, and these methods are broadly described in the literature published on information retrieval. In this particular embodiment of the invention, a similarity measurement is preferably chosen to calculate the similarity between each blended profile and the current web page.

Regardless of the number of blended profiles and the specific heuristic function, if the value of the heuristic function assigned to the web page is higher than a previously set threshold, then the web page is added to the set of potentially suitable stimuli, which is intended to be subsequently presented to the user.

In this particular embodiment of the invention, the wandering/search is preferably both time and quality limited, which means that as soon as a sufficient number of web pages are identified as potential stimuli, the search ends and returns the web pages. If no web pages are identified conforming to those criteria within a time frame previously stipulated, the search ends up with no stimuli to present to the user.

While various embodiments of the invention have been described, it will be apparent to those of ordinary skill in the art that many more embodiments and implementations are possible within the scope of the invention. Throughout this specification, unless the context requires otherwise, the words "comprise" and "include" and variations such as "comprising" and "including" will be understood to imply the inclusion of an item or group of items, but not the exclusion of any other item or group items. Furthermore, although various indications have been given as to the scope of this invention, the invention is not limited to any one of these but may reside in two or more of these combined together. Accordingly, the invention is not to be restricted except in light of the claims and their equivalents.

The invention claimed is:

1. A method for supporting serendipity and pseudo-serendipity by providing unsought, unexpected, unforeseen information to a user aimed at stimulating the user's sagacity and at providing the user with cognitive material for the formation of creative and/or insightful ideas, the method comprising the steps of:
    a) acquiring, classifying and managing the user's world-view in a plurality of profiles;
    b) hypothesizing and storing extraneous data divergent from the user profiles in shadow profiles by deliberately relying on controlled random processes and cross-fertilization of concept from the user profiles and by looking for lateral concepts or ideas in information and knowledge sources; and
    c) producing stimuli for the user based on controlled random processes and by looking for and evaluating potentially serendipitous data, using the user profiles, divergent search queries on information spaces, knowledge bases and additional resources.

2. A computer system for supporting serendipity and pseudo-serendipity by providing unsought, unexpected, unforeseen information to a user aimed at stimulating the user's sagacity and at providing the user with cognitive material for the formation of creative and/or insightful ideas, the computer system a processor; comprising:
    a) a Profiles Management Module, responsible for acquiring, classifying and managing the user's world-view in a plurality of profiles;
    b) a Divergence Module, responsible for hypothesizing and storing extraneous data divergent from the user profiles in shadow profiles by deliberately relying on controlled random processes and cross-fertilization of concept from the user profiles and by looking for lateral concepts or ideas in information and knowledge sources; and
    c) a Stimuli Generation Module, responsible for producing stimuli for the user based on controlled random processes and by looking for and evaluating potentially serendipitous data, using the user profiles, divergent search queries on information spaces, knowledge bases and additional resources.

3. A computer-readable program storage device, having a set of program instructions physically embodied thereon, executable by a computer, to support serendipity and pseudo-serendipity by providing unsought, unexpected, unforeseen information to the user aimed at stimulating the user's sagacity and at providing the user with cognitive material for the formation of creative and/or insightful ideas, as recited in claim 2.

* * * * *